Jan. 8, 1929.　　　　　　　　　　　　　　　　　　1,698,022
A. D. MACGILLIVRAY
DEMOUNTABLE RIM
Filed Feb. 25, 1927　　　2 Sheets-Sheet 1
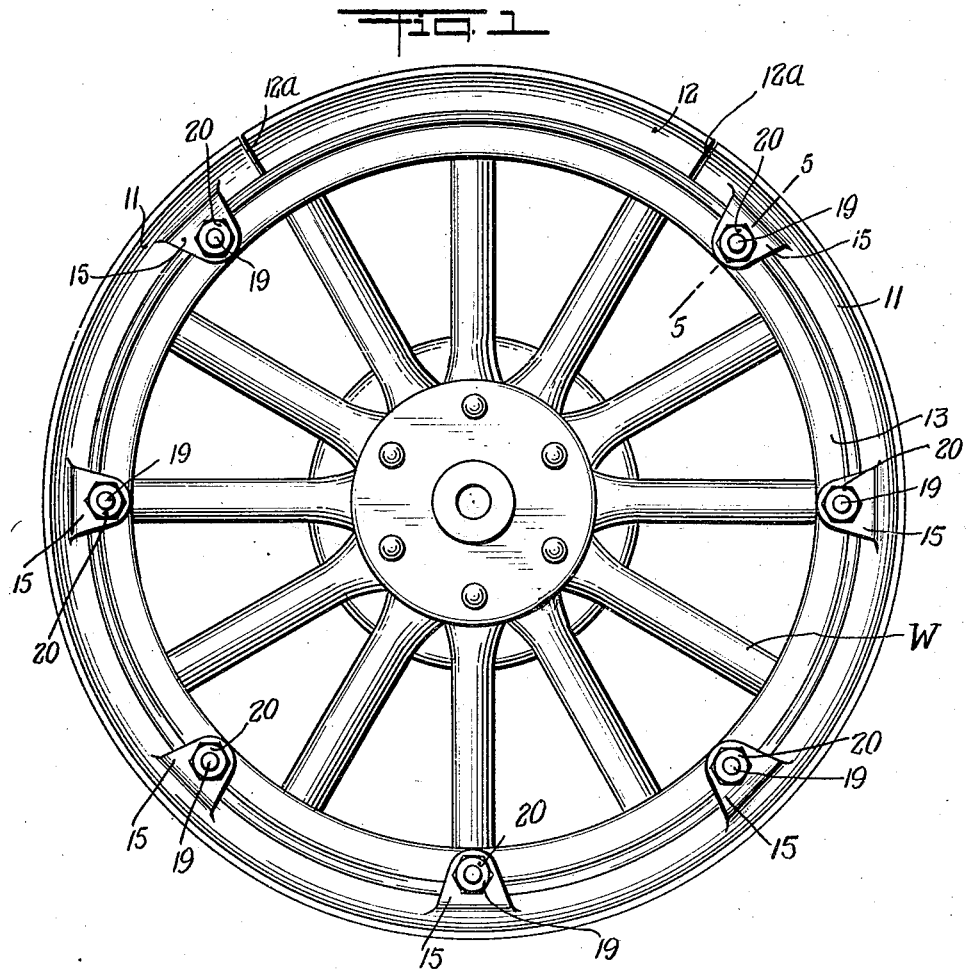
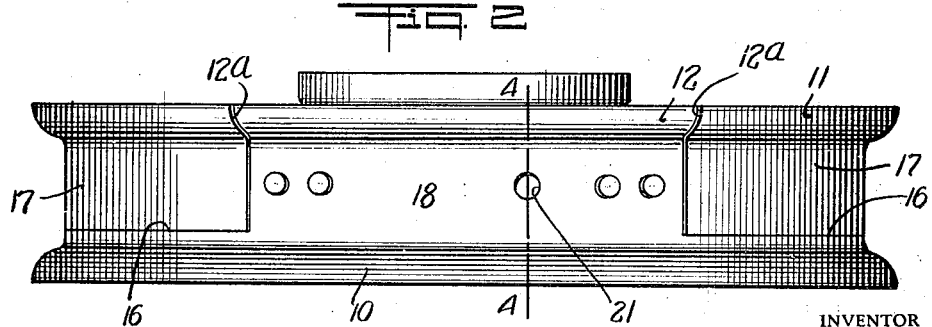
INVENTOR
Alister Duncan Macgillivray
BY
Mock & Blum
ATTORNEYS Jan. 8, 1929.
A. D. MACGILLIVRAY
1,693,022
DEMOUNTABLE RIM
Filed Feb. 25, 1927 2 Sheets-Sheet 2
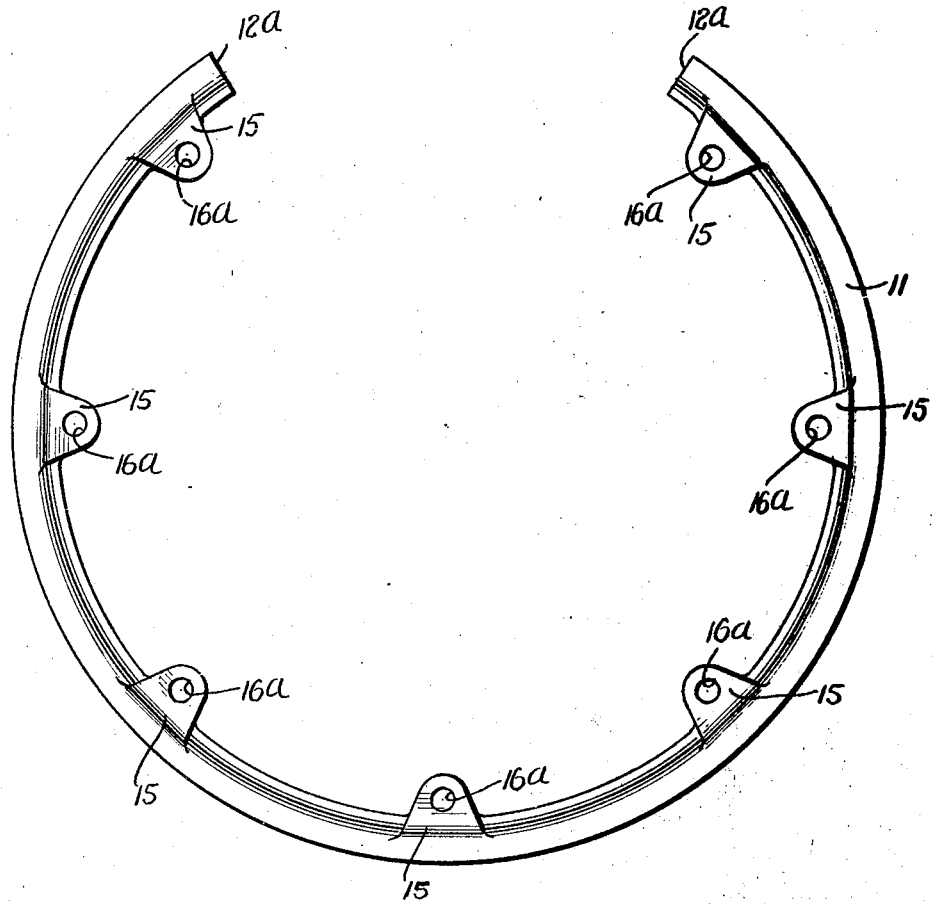
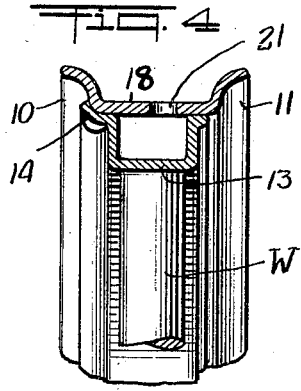
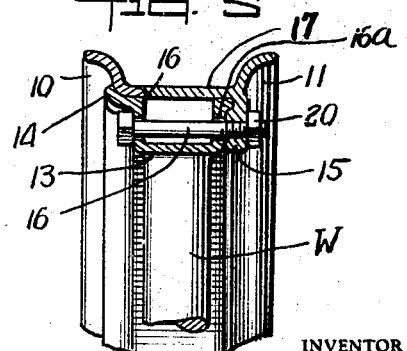
INVENTOR
Alister Duncan Macgillivray
BY
ATTORNEYS Patented Jan. 8, 1929.

1,698,022

UNITED STATES PATENT OFFICE.

ALISTER DUNCAN MACGILLIVRAY, OF SAN PEDRO DE MACORIS, DOMINICAN REPUBLIC.

DEMOUNTABLE RIM.

Application filed February 25, 1927. Serial No. 170,860.

My invention relates to a new and improved form of tire retaining rim for wheels of automobiles or the like.

One of the objects of my invention is to provide a tire retaining rim which will be of simple and sturdy construction and which will enable a tire to be readily applied to and removed from the wheel of an automobile.

Another object of my invention is to provide a rim structure embodying a detachable retaining member of discontinuous circular contour.

Another object of my invention is to provide a tire retaining rim structure which shall be independent of the expansion or wedge means heretofore used in connection with demountable rims of the well known type.

Another object of my invention is to provide a rim construction of great rigidity and firmness, and which will enable the tire to be removed or applied with very little or no injury thereto.

Other objects of my invention will be set forth in the following description and drawings which illustrate a preferred embodiment thereof, it being understood that the above general statement of the objects of my invention is intended merely to generally explain the same and not to limit it in any manner.

Fig. 1 is a front elevation showing the improved device.

Fig. 2 is a top view of the device shown in Fig. 1.

Fig. 3 is a front elevation of the detachable rim member.

Fig. 4 is a section on the line 4—4 of Fig. 2.

Fig. 5 is a section on the line 5—5 of Fig. 1.

Demountable rim constructions of the ordinary type have heretofore included circular rims having a continuous contour or periphery which were held in position by means of laterally movable wedge like members which served to expand the demountable rim and to hold it in position on the felly of the wheel. In applying a tire to such a rim, or in removing the tire from the rim, it was necessary to stretch and twist the tire, so that the tire suffered considerable injury every time it was applied or removed, especially if the workmen were careless.

According to my invention, the tire can be assembled with the rim structure or be removed therefrom with little or no injury, even by a careless workman.

My invention is preferably employed in connection with a detachable wheel of any well known type, such as a disk wheel or a wire wheel. However, my invention is not restricted to the use thereof in connection with a detachable wheel and in the drawings I have shown it in association with an ordinary wooden wheel W. This wheel is provided with a felly 13 of any suitable type. In the embodiment herein illustrated, the felly 13 has a recessed or U-shaped contour so that it is provided with two vertical side walls. However, the felly 13 may be solid, so that it is provided with a smooth outer surface.

A main rim member 18 is suitably connected to the felly of the wheel. This main rim member 18 can be permanently connected to the wheel by welding or the like. Likewise, it may be connected to the felly of the wheel by fastening members of any suitable type which are independent of the fastening members which connect the detachable rim member to the wheel, so that the detachable rim member can be removed from the wheel while the main rim member 18 remains connected to the wheel.

The main rim member 18 has a continuous rear vertical flange 10 and it is provided for substantially five-sixths of the periphery thereof with a front edge 16. This front edge 16 extends to a laterally projecting portion which terminates in a short vertical flange 12 having vertical edges. As shown in Fig. 1, the front flange 12 of the main rim member occupies about one-sixth of the circumference of the felly.

As shown in Fig. 2, the lateral projection of the main rim member 18 may have flaring edges cooperating with the edges $12^a$ of the member 17 so as to prevent any lateral movement of the detachable rim member 17, when the parts are assembled as shown in Fig. 2, but my invention is not limited to this construction.

The main rim member 18 is provided with an opening 21 for the valve of the pneumatic tire which is to be held upon the wheel.

As shown in Fig. 3, the detachable rim member 17 has a discontinuous circular contour or periphery and it terminates in lateral edges $12^a$ which have the same contour as the lateral edges of the projection of the main rim member 18. The front detachable rim member 17 is also provided with vertical fastening lugs 15 having bolt openings $16^a$. The rear edge of the detachable rim member 17 is free from a flange, and the said detachable rim member 17 is provided at the front thereof with a front flange 11 which is complemental to the front vertical flange 12 of the lateral projection of the main rim member 18.

As shown in Fig. 5, the felly 13 may have a concave or recessed contour and it is provided at the rear edge thereof with a shoulder 14 upon which the main rim member 18 is adapted to rest. The main rim member 18 may be welded to the shoulder 14 or be connected thereto by any suitable fastening means. Likewise, the main rim member 18 may rest detachably upon the shoulder 14.

The front member 17 is held in position by means of bolts 16 having nuts 20. As shown in Fig. 5, the detachable rim member 17 interlocks with the felly 13. Even if the main rim member 18 is detachable from the felly 13, it is held in position by the bolts 16, in the construction shown in Fig. 5.

After a pneumatic tire has been mounted and used for the customary period of time, there is considerable adhesion between the beads of the tire and the adjacent surfaces of the rim.

However, according to my invention, if it is necessary to replace a tire upon a wheel, the wheel can be detached (if it is of the detachable type) and the nuts 20 can then be readily removed. Since the main rim member 18 is relatively very narrow (save for the projection thereof terminating in the flange 12) it is very simple to tilt the detachable member 17 together with the tire upon the felly of the wheel so as to forwardly tilt that part of the member 17 which is opposite to the flange 12, until this part of this rim member 17 substantially clears the felly of the wheel so that the valve of the tire is released from the opening 21. Since, as shown in Fig. 5 for example, the front or detachable rim member has a width which is almost equal to the entire width of the device, both beads of the tire rest upon the front member 17. Hence, when the rim member 17 is removed by the tilting and lifting movement described herein, the entire tire is removed with it, without disturbing the position of the tire with respect to the member 17. The assembled tire and rim member 17 can then be removed from the felly of the wheel by a lifting movement. Since the detachable rim member 17 has no flange at the rear thereof, it is then very easy to separate the rim member 17 from the tire, without any injury to the tire. This operation is further facilitated by the fact that the detachable rim member 17 has a discontinuous periphery.

After the tire has been repaired, it can be very easily placed upon the detachable rim member 17, and the assembled tire and rim member 17 can then be mounted upon the felly of the wheel by reversing the operations above mentioned.

In order to permit the detachable rim member 17 to be removed from the wheel by the tilting and lifting movement above mentioned, it is important that the front flange 12 should not be too long and hence I prefer that it should not extend around more than about 60° of the circumference of the wheel.

I have shown a preferred embodiment of my invention, but it is clear that numerous changes and omissions could be made without departing from its spirit.

I prefer to have the front rim member 17 discontinuous because this form enables the tire and the associated rim member to be removed most easily by a tilting and lifting movement, and also facilitates the separation of the rim member from the tire.

I claim:—

A tire retaining device comprising a first member having an outer circumferential edge provided with a substantially continuous flange, said first member also having an inner circumferential edge having a discontinuous and laterally projecting portion having a flange, and a second member complemental to said first member, said complemental member having an inner circumferential edge adjacent the inner circumferential edge of said first member, the lateral edges of said complemental member being adjacent the edges of said laterally projecting portion, said complemental member having a flange at the outer circumferential member thereof which is complemental to the flange of said laterally projecting portion, said complemental member being sufficiently wide to have both beads of the tire rest thereon, said projecting portion being sufficiently short to permit the complemental member and a tire mounted thereon to be separated from the first member by a tilting and lifting movement, said first member and said complemental member being free from any connections adapted to prevent said tilting and lifting movement.

In testimony whereof I affix my signature.

ALISTER DUNCAN MACGILLIVRAY.